United States Patent [19]

Ormond

[11] 3,874,229
[45] Apr. 1, 1975

[54] PANCAKE LOAD CELL

[76] Inventor: Alfred Newman Ormond, 11969 E. Rivera Rd., Santa Fe Springs, Calif. 90670

[22] Filed: Mar. 11, 1974

[21] Appl. No.: 449,901

[52] U.S. Cl.............................. 73/141 A, 177/211
[51] Int. Cl. ................................................ G01l 1/22
[58] Field of Search ............ 73/88 E, 141 R, 141 A, 73/398 AR; 177/208, 211; 338/5, 4

[56] References Cited
UNITED STATES PATENTS

| | | | |
|---|---|---|---|
| 2,148,013 | 2/1939 | Carlson | 73/88 E |
| 2,336,500 | 12/1943 | Osterberg | 73/141 A |
| 3,139,598 | 6/1964 | Ruge | 338/4 |
| 3,529,468 | 9/1970 | Carlson | 73/88 E |

Primary Examiner—Charles A. Ruehl
Attorney, Agent, or Firm—Pastoriza & Kelly

[57] ABSTRACT

A load cell is formed in the shape of a pancake so as to be readily accommodated beneath objects to be weighed wherein the vertical clearance is low. The body includes a pancake shaped inner chamber filled with oil, a wall portion of the chamber being thinned to define a diaphragm. Strain gauges connect to the diaphragm which is responsive to pressure changes in the chamber as a consequence of weight tending to squeeze the pancake configuration, the strain gauges providing electrical signals constituting a function of the weight or force applied to the cell.

4 Claims, 5 Drawing Figures

3,874,229

PANCAKE LOAD CELL

This invention relates to load cells and more particularly to a specially designed load cell construction providing a pancake configuration for measuring certain types of loads wherein sheer forces are substantially completely isolated.

BACKGROUND OF THE INVENTION

Known types of load cells generally take the form of a structural member having portions which deform under a load so that strain gauges attached to such portions will provide a signal constituting a function of such load applied to the cell. In its simplest form, the load cell may simply comprise a solid column for measuring compression or tension forces applied along the axis of the column. Thus, one set of strain gauges may be applied to the column to measure compression forces and another set of strain gauges at right angles positioned to measure tension forces, the strain gauges being incorporated in a simple electrical bridge circuit to provide an output signal indicative of the applied force.

Other load cell structures may include thinned portions in the form of webs to which the strain gauges are attached and which will flex under loads to provide a desired output signal. Still others may take various geometric shapes such as the well-known Rhombic type of load cell.

In designing a load cell for particular applications, it is often desirable to make sure that certain forces are isolated from affecting the strain gauges on the load cell. For example, if only an axial force is to be measured by a column type load cell it is important that rotational or twisting type forces which can affect the strain gauges be isolated from the axially directed forces. In addition, side forces and sheer forces can introduce undesirable signals. In many instances, undesirable forces can be isolated from the load cell by proper mounting with specifically designed flexures. These additions, however, contribute to the overall cost of a load cell and complicate its geometry so that it is not useful in certain applications.

One example of a situation wherein it has been difficult to design a proper load cell is where the vertical clearance is extremely limited. For example, it might be desirable to weigh an object by simply rolling it on top of a load cell. If the load cell has any appreciable vertical dimension, it is not an easy matter to support the object to be weighed or even to position it on the load cell. In other instances, a squeezing force applied by two members which are spaced closely together cannot easily be made unless the load cell has a sufficiently low profile as to be receivable between the members. In still other instances, there are situations where relatively large compression forces are to be measured over substantial areas and wherein the provision of a large vertical clearance is not feasible. An example would be measuring soil compaction under a freeway.

BRIEF DESCRIPTION OF THE PRESENT INVENTION

With the foregoing considerations in mind, the present invention contemplates a specially designed load cell of pancake configuration wherein the thickness of the load cell is very small compared to its diameter. The design is such that not only does a low profile result rendering it very simple to measure loads in situations where there is a small vertical clearance but in addition the design is such as to render the cell substantially insensitive to sheer forces so that only loads directed substantially vertical to the large surface of the load cell are measured.

More particularly, in accord with the present invention the load cell comprises a flat body incorporating an inner chamber having a diameter substantially greater than its thickness to define a pancake shape. An incompressible fluid for example, oil, fills completely the chamber. A given area of a wall of the body is thinned to define a diaphragm. This diaphragm is responsive to the pressure of the fluid in the chamber. Strain gauge means are secured to the surface of the diaphragm to provide electrical signals constituting a function of the fluid pressure.

With the foregoing arrangement, the body can flex slightly under large squeezing loads applied to the pancake configuration resulting in a compression of the fluid and thus aa slight deformation of the diaphragm. This deformation, in turn, gives rise to an electrical signal constituting a function of the load.

BRIEF DESCRIPTION OF THE DRAWINGS

A better understanding of the invention will be had by now referring to a preferred embodiment as illustrated in the accompanying drawings in which.

DETAILED DESCRIPTION OF THE PREFERRED EMBODIMENT

Figure 1:
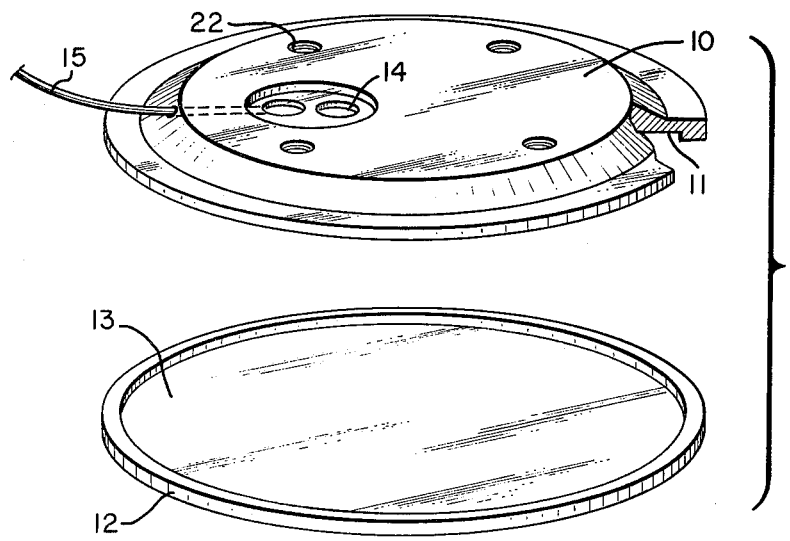
FIG. 1 is an exploded perspective view of the basic components making up the load cell of this invention.

Referring first to FIG. 1, the load cell comprises an upper flat plate member 10 having an upper shallow cavity formed on its underside as indicated at 11. A lower flat plate member 12 in turn includes a lower shallow cavity 13 on its top side opposing the upper shallow cavity 11. The upper and lower plate members 10 and 12 are essentially mirror images of each other, the upper plate 10 differing only from the lower plate 12 in the provision of an access opening 14 formed to one side of its central area on its top as shown.

As will become clearer as the description proceeds, the access opening 14 which is preferably covered with a glass or other type cover plate houses certain electrical components connected to suitable strain gauge means, output electrical leads passing radially from the side of the plate 10 as shown at 15.

Figure 2:
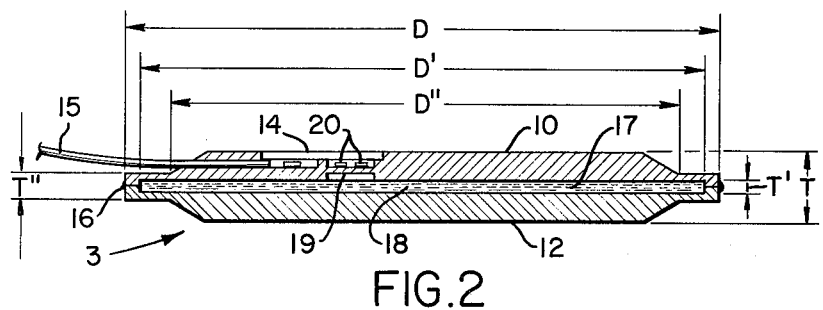
FIG. 2 is a cross section of the elements of FIG. 1 after they have been assembled together.

The symmetry of the members will be more evident from FIG. 2 wherein the upper plate is shown positioned on top of the lower plate, means being provided to hermetically seal the plates together as by welding the peripheral edge shown at 16 over 360°. With the upper and lower plates secured together as shown, the shallow cavities define an hermetically sealed chamber 17 within the members. It will be evident that the overall shape is of a general pancake configuration.

As indicated in FIG. 2, the chamber 17 is filled with an incompressible fluid such as oil 18. The upper plate 10 includes a thinned wall area in the ceiling of its shallow cavity defining a diaphragm 19, the underside of which is subject to the pressure of the oil 18 in the cavity and thus responsive to this pressure. The opposite side of the thin-walled portion defining the diaphragm 19 is provided with strain gauge means 20 secured thereto, access being had to the strain gauges through the access opening 14.

In order that the load cell operate effectively, certain dimensions must bear a given relationship with each other at least within certain ranges. FIG. 2 illustrates some of these dimensions as follows: the overall outside diameter of the load cell is designated D while the inside diameter of the chamber 17 is designated D'. The outside central area of the load cell in turn has a thickness designated T whereas the inside thickness of the chamber 17 is indicated at T'.

In accord with the preferred design of the load cell, a peripheral portion of the members radially beyond the central area of thickness T has a reduced outside thickness of T", the diameter of the end of the reduced outside thickness being designated D". Thus, the assembled plate members define a relatively thin peripheral profile which thickens to define a concentric diametric portion D' of overall greater thickness than the thinned peripheral portion.

Figure 3:
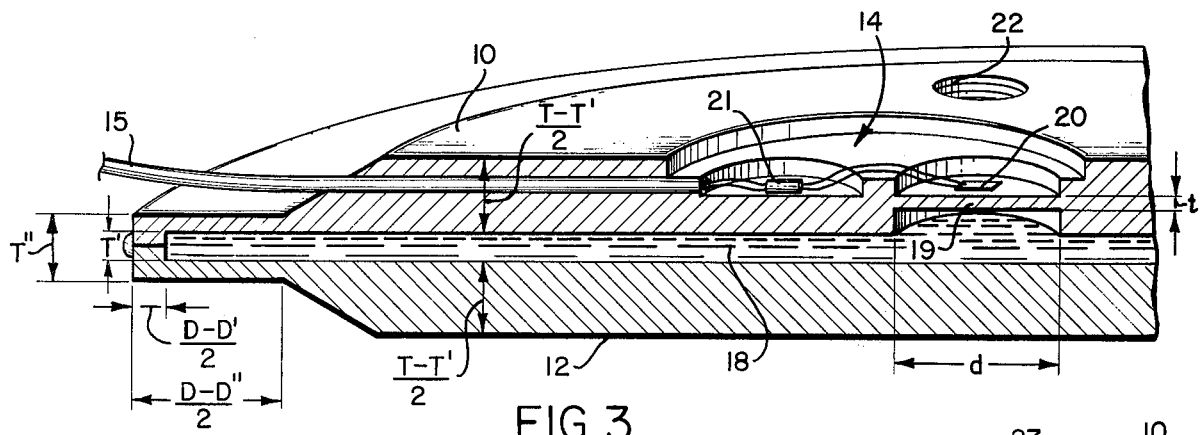
FIG. 3 is a greatly enlarged fragmentary perspective view looking in the direction of the arrow 3 of FIG. 2.

Referring now to FIG. 3, further details of the load cell design will be evident. Referring first to the right hand portion of FIG. 3 the diaphragm 19 is of circular configuration of diameter $d$ which is substantially less than the inside diameter D' of the chamber 17 described in FIG. 2. The strain gauge means 20 themselves are shown secured to the top of the diaphragm 19 with suitable leads extending to circuit components such as indicated at 21 within the access area 14. The electrical output leads are shown extending through the central thickened portion of the top plate member 10 out the side within the cable 15 as described in FIG. 1. The thickness of the diaphragm 19 is indicated at $t$.

Referring to the left portion of FIG. 3, various dimensions can readily be derived from the basic diametric dimensions defined by the letters D, D', and D". Similarly, various thickness dimensions can be derived from the basic thickness dimensions T, T' and T".

It will be appreciated that when a force is applied on the top plate 10 in a downward direction, the fluid 18 will be compressed. This compression, however, results from a flexing of the thin peripheral wall portion of the plate, the central thickened wall portion of the plate remaining substantially rigid. In other words, because of the thin peripheral portion of the plates making up the load cell, slight flexing as a consequence of a squeezing force or force directed along an axis normal to the planar surfaces of the plates will tend to flex the structure at the peripheral engaging portions of the plate edges. The reduced thickness portion of the load cell in this peripheral area permits this flexing. Because of the symmetry over 360°, any side or sheer forces are substantially cancelled since, in effect, a sheer movement of one of the plates relative to the other would not affect the pressure applied to the fluid 18 nor is there really any portion of the structure that could flex to accommodate such sheer force. As a consequence, the incompressible fluid 18 will vary in pressure only in accord with the normal or perpendicular force applied to the plate members.

In order that the isolation of the sheer forces is assured, the various dimensions should bear a definite relationship to each other within given limits. In the broadest aspect, the following relationships exist between the outside diameter D and the central area thickness T of the load cell and the inside diameter D' and the inside thickness T' of the chamber:

$10 < D/T < 20$      $8 < D'/T' < 18$
$1.001 < D/D' < 1.050$      $5 < T/T' < 11$

Moreover, in order to maintain the integrity of the strength of the top plate, it is desirable that the diameter $d$ of the diaphragm be substantially smaller than the diameter D' of the chamber. Also, the diaphragm thickness $t$ should have a relationship to its diameter $d$ in order that it be sufficiently responsive to pressure variations to give rise to signals by the attached strain gauges. With respect to these latter dimensions, the following relationships exist:

$10 < D'/d < 16$      $20 < d/t < 30$.

With respect to the dimensions D" and T" relative to the dimensions D and T, the following relationships should obtain:

$1.10 < D/D" < 1.20$      $3 < T/T" < 6$.

In a preferred embodiment of the invention, the relationship of the various dimensions are as follows within the indicated tolerances:

$D/T = 15.5 \pm 0.5$
$D'/T' = 13.0 \pm 0.5$
$D/D' = 1.035 \pm 0.002$
$T/T' = 8.75 \pm 0.25$
$D'/d = 13.2 \pm 0.5$
$d/t = 25.0 \pm 1.0$
$D/D" = 1.150 \pm 0.025$
$T/T" = 4.75 \pm 0.25$

An actual cell in which the above relative dimensions obtained has an outside diameter D of 10.250 inches and a central area thickness T of 0.664 inches, the inside chamber diameter D' was 9.910 inches and the inside thickness of the chamber T' was 0.076 inches. From these basic dimensions, the various other dimensions can readily be derived from the foregoing relationships.

In FIG. 3, it will be noted that the top plate 10 includes a threaded opening or tap 22 formed in the metal. Four such taps may be provided as indicated in FIG. 1 and are for the purpose of securing the plate and thus the entire load cell to a member through which a force is applied to the cell.

Figure 4:
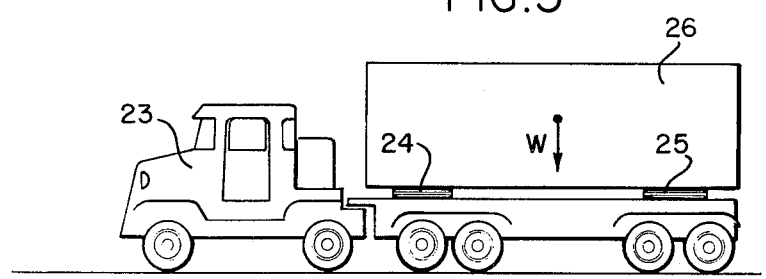
FIG. 4 shows a truck with load cells in accord with one application of the invention.

Referring now to FIG. 4 there is illustrated a very practical application of the particularly designed load cell. In FIG. 4, there is shown a trailer truck 23 wherein load cells 24 and 25 of the pancake configuration such as described in FIGS. 1–3 are incorporated beneath the trailer load carrying enclosure 26 and the truck bed. Thus by supporting the entire enclosure 26 on the bed solely by means of, for example, four such load cells at the four corners, the weight of contents within the truck can at all times be indicated.

The application of the load cell to a truck such as indicated in FIG. 4 is particularly advantageous since the load cells are insensitive to sheer and thus even though the truck may be traveling around curves at high speeds which would tend to exert a sheer load on the cells, they will accurately reflect only the vertically downwardly directed forces resulting from the weight of contents within the truck.

Other applications will readily occur to those skilled in the art. For example, an entire truck or other type vehicle can readily be weighed by simply driving the truck onto the top of four or more strategically placed load cells. Because of their extremely low vertical profile and large receiving area, the weighing of objects such as trucks and the like can readily be carried out without requiring expensive, permanent installations.

Figure 5:
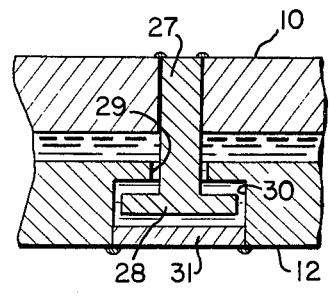
FIG. 5 is a fragmentary cross-section of the load cell illustrating stop means.

FIG. 5 shows a stop means which may be incorporated in the load cell to limit the movement of the plate members towards and away from each other in the event a compression or tension force should exceed given limits. This stop means includes a central stem 27 welded securely in the upper plate member 10 and passing through the chamber to terminate in an enlarged head 28 in the lower plate member 12.

The plate member 12 in turn includes an enlarged opening 29 in the floor of its cavity receiving the stem, this opening being counterbored at 30 and closed by plate 31 to define upper and lower stops on either side of the enlarged head 28.

With the above arrangement, it will be evident that should a sudden large tension force occur on the cell as might be the case should the truck of FIG. 4 bounce, the head 28 will impact the annular shoulder defined by the counterbore 30 and thus limit the flexing at the periphery of the cell. Similarly, if an overload compressive force is exerted, the head 28 will seat on the plate 30 and thus limit the inward flexing. The clearances on either side of the head 28 could be as little as .005 inches.

From the foregoing description, it will thus be evident that the present invention has provided a greatly improved load cell design particularly useful for measuring various loads where vertical clearance is limited and wherein it is desirable to isolate sheer forces.

What is claimed is:

1. A load cell comprising:
   a. an upper flat circular plate member having an upper shallow circular cavity on its underside;
   b. a lower flat circular plate member having a lower shallow circular cavity on its top side opposing said upper shallow circular cavity;
   c. means securing said upper plate member on top of said lower plate member such that the shallow cavities define an hermetically sealed circular chamber of inside diameter $D'$ and inside thickness $T'$ within said members, the overall configuration resulting in a general pancake shaped load cell of outside diameter $D$ and outside central area of thickness $T$, the peripheral portion of the members radially beyond the central area of thickness $T$ having a reduced outside thickness of $T''$, the diameter of the end of the reduced outside thickness being $D''$; wherein:

$$10 < D/T < 20 \quad 8 < D'/T' < 18,$$
$$1.001 < D/D' < 1.050 \quad 5 < T/T' < 11,$$

-Continued $$1.10 < D/D'' < 1.20 \text{ and } 3 < T/T'' < 6;$$

d. a substantially incompressible fluid filling said chamber, said upper plate member including a thinned wall area in the ceiling of its shallow cavity substantially less than the total area of the cavity defining a diaphragm of diameter $d$ and thickness $t$ responsive to the pressure of the fluid in said chamber, wherein:

$$10 < D/d < 16 \quad \text{and} \quad 20 < d/t < 30;$$

and e. strain gauge means secured to said diaphragm for providing a signal constituting a function of the pressure of said fluid whereby said load cell can be easily accommodated in areas of low vertical clearance to support objects to be weighed.

2. A load cell according to claim 1, in which:
$D/T = 15.5 \pm 0.5$
$D'/T' = 13.0 \pm 0.5$
$D/D' = 1.035 \pm 0.002$
$T/T' = 8.75 \pm 0.25$
$D'/d = 13.2 \pm 0.5$
$d/t = 25.0 \pm 1.0$
$D/D'' = 1.150 \pm 0.025$
$T/T'' = 4.75 \pm 0.25$ 3. A load cell according to claim 1, in which said means securing said upper plate member on top of said lower plate member comprises welding of the peripheral edge of the upper plate member to the peripheral edge of the lower plate member over 360° and wherein said substantially incompressible fluid comprises oil.

4. A load cell according to claim 1 including stop means limiting the movement of the plates towards and away from each other whereby when given compression and tension forces on the load cell exceed given values, the flexing of the peripheral portion of the cell is limited.

* * * * *